(12) United States Patent
Ahn et al.

(10) Patent No.: US 12,086,599 B2
(45) Date of Patent: Sep. 10, 2024

(54) ACCELERATOR, METHOD OF OPERATING THE ACCELERATOR, AND DEVICE INCLUDING THE ACCELERATOR

(71) Applicant: Samsung Electronics Co., Ltd., Suwon-si (KR)

(72) Inventors: Jaehyung Ahn, Suwon-si (KR); Wooseok Chang, Seoul (KR); Yongha Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/717,302

(22) Filed: Apr. 11, 2022

(65) Prior Publication Data
US 2022/0229668 A1 Jul. 21, 2022

Related U.S. Application Data

(63) Continuation of application No. 16/922,073, filed on Jul. 7, 2020, now abandoned.

(30) Foreign Application Priority Data

Dec. 20, 2019 (KR) .................. 10-2019-0172348

(51) Int. Cl.
*G06F 13/14* (2006.01)
*G06F 9/38* (2018.01)
(Continued)

(52) U.S. Cl.
CPC .......... *G06F 9/3838* (2013.01); *G06F 9/3877* (2013.01); *G06F 9/4881* (2013.01);
(Continued)

(58) Field of Classification Search
CPC .... G06F 9/3838; G06F 9/3877; G06F 9/4881; G06F 13/12; G06F 2213/0026; G06N 3/08
See application file for complete search history.

(56) References Cited

U.S. PATENT DOCUMENTS

| | | | |
|---|---|---|---|
| 4,749,238 A | 6/1988 | Singleton et al. | |
| 4,899,163 A | 2/1990 | Daniel et al. | |

(Continued)

FOREIGN PATENT DOCUMENTS

| | | | |
|---|---|---|---|
| JP | 6316503 B2 | 4/2018 | |
| KR | 10-2017-0117565 A | 10/2017 | |

(Continued)

OTHER PUBLICATIONS

European Office Action issued on Feb. 3, 2023, in counterpart European Patent Application No. 20205918.4 (8 pages in English).

(Continued)

*Primary Examiner* — Cheng Yuan Tseng
(74) *Attorney, Agent, or Firm* — NSIP Law

(57) ABSTRACT

A method of operating an accelerator includes receiving, from a central processing unit (CPU), commands for the accelerator and a peripheral device of the accelerator, processing the received commands according to a subject of performance of each of the commands, and transmitting a completion message indicating that performance of the commands is completed to the CPU after the performance of the commands is completed.

17 Claims, 10 Drawing Sheets

(51) Int. Cl.
    *G06F 9/48*     (2006.01)
    *G06F 13/12*     (2006.01)
    *G06N 3/08*     (2023.01)

(52) U.S. Cl.
    CPC ............... *G06F 13/12* (2013.01); *G06N 3/08* (2013.01); *G06F 2213/0026* (2013.01)

(56) References Cited

U.S. PATENT DOCUMENTS

| | | | | |
|---|---|---|---|---|
| 4,989,163 | A * | 1/1991 | Kawamata | G06F 3/1256 358/1.6 |
| 6,191,758 | B1 * | 2/2001 | Lee | G06F 3/1423 345/2.2 |
| 7,071,946 | B2 * | 7/2006 | Jeddeloh | G06F 12/0292 345/519 |
| 7,114,035 | B2 * | 9/2006 | Day | G06F 12/126 711/E12.075 |
| 7,500,047 | B1 * | 3/2009 | Tyndall | H04L 69/18 710/311 |
| 8,589,607 | B1 * | 11/2013 | Singh | G06F 13/10 710/14 |
| 8,725,879 | B2 * | 5/2014 | Ajima | H04L 67/142 709/227 |
| 8,850,027 | B2 | 9/2014 | Srinivas et al. | |
| 9,335,757 | B2 * | 5/2016 | Kudou | G05B 19/4063 |
| 9,838,498 | B2 | 12/2017 | Liu et al. | |
| 10,175,991 | B2 * | 1/2019 | Biran | G06F 13/4282 |
| 10,216,448 | B2 | 2/2019 | Nakagawa et al. | |
| 10,331,590 | B2 | 6/2019 | MacNamara et al. | |
| 10,503,434 | B2 * | 12/2019 | McGlaughlin | G06F 3/0656 |
| 10,699,447 | B2 | 6/2020 | Dwivedi | |
| 10,713,196 | B1 * | 7/2020 | Vu | H04L 1/0052 |
| 10,719,474 | B2 * | 7/2020 | Kachare | G06F 3/0659 |
| 10,776,145 | B2 * | 9/2020 | Iyer | G06F 9/45558 |
| 10,970,238 | B2 * | 4/2021 | Sankaran | G06F 13/4221 |
| 2004/0010612 | A1 * | 1/2004 | Pandya | H04L 9/40 709/213 |
| 2008/0244126 | A1 | 10/2008 | Hundley | |
| 2009/0222128 | A1 | 9/2009 | Clark et al. | |
| 2010/0242055 | A1 | 9/2010 | Aguilera et al. | |
| 2012/0254587 | A1 | 10/2012 | Biran et al. | |
| 2014/0289445 | A1 * | 9/2014 | Savich | G06F 17/16 710/317 |
| 2017/0153892 | A1 * | 6/2017 | Linsky | G06F 9/3897 |
| 2019/0163364 | A1 * | 5/2019 | Gibb | H04L 69/321 |
| 2019/0171941 | A1 | 6/2019 | Quach et al. | |
| 2019/0243780 | A1 * | 8/2019 | Gopal | G06F 12/0811 |
| 2019/0361708 | A1 | 11/2019 | Soe et al. | |
| 2019/0361821 | A1 * | 11/2019 | Ryu | G06F 30/34 |
| 2020/0082890 | A1 * | 3/2020 | Karr | G06F 3/0688 |
| 2020/0117990 | A1 * | 4/2020 | Rhu | G06N 3/045 |
| 2020/0133909 | A1 * | 4/2020 | Hefty | G06F 13/28 |
| 2020/0250545 | A1 * | 8/2020 | Verrilli | G06N 3/045 |
| 2021/0053575 | A1 * | 2/2021 | Bielby | G06V 10/82 |
| 2021/0142177 | A1 * | 5/2021 | Mallya | G06N 3/084 |
| 2021/0149719 | A1 * | 5/2021 | Jones | G06F 9/541 |
| 2021/0149734 | A1 * | 5/2021 | Gurfinkel | G06F 9/4843 |
| 2021/0191728 | A1 * | 6/2021 | Ahn | G06F 9/3877 |

FOREIGN PATENT DOCUMENTS

| | | |
|---|---|---|
| KR | 10-2019-0035988 A | 4/2019 |
| WO | WO 2017/119098 A1 | 7/2017 |
| WO | WO 2017/187582 A1 | 11/2017 |
| WO | WO 2019/165355 A1 | 8/2019 |

OTHER PUBLICATIONS

Li et al., "A Network-Centric Hardware/Algorithm Co-Design to Accelerate Distributed Training of Deep Neural Networks," 2018 51st Annual IEEE/ACM International Symposium on Microarchitecture, pp. 175-188.

Kwon et al., "DCS-ctrl: A Fast and Flexible Device-Control Mechanism for Device-Centric Server Architecture," IEEE Computer Society, 2018 ACM/IEEE 45th Annual International Symposium on Computer Architecture (ISCA), pp. 491-504.

Ahn et al., "DCS: a fast and scalable device-centric server architecture," MICRO-48 Proceedings of the 48th International Symposium on Microarchitecture, pp. 559-571.

European Search Report issued by the European Patent Office on Apr. 8, 2021 in counterpart EP Patent Application No. 20205918.4 (12 pages in English).

Extended European Search Report issued on Aug. 13, 2021, in Counterpart European Patent Application No. 20205918.4 (13 pages in English).

* cited by examiner

ACCELERATOR, METHOD OF OPERATING THE ACCELERATOR, AND DEVICE INCLUDING THE ACCELERATOR

CROSS-REFERENCE TO RELATED APPLICATIONS

This application is a continuation of U.S. application Ser. No. 16/922,073 filed on Jul. 7, 2020, which claims the benefit under 35 USC § 119(a) of Korean Patent Application No. 10-2019-0172348 filed on Dec. 20, 2019, in the Korean Intellectual Property Office, the entire disclosure of which are incorporated herein by reference for al purposes.

BACKGROUND

1. Field

The following description relates to an accelerator, a method of operating the accelerator, and a device including the accelerator.

2. Description of Related Art

A machine learning application including a deep neural network (DNN) may include numerous operations including a great amount of calculation or memory requirements. The machine learning application may thus use a great amount of resources. Thus, there is a desire for an improved technology for neural network calculation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of operating an accelerator includes receiving, from a central processing unit (CPU), commands for the accelerator and a peripheral device of the accelerator, processing the received commands according to a subject of performance of each of the commands, and transmitting a completion message indicating completion of performance of the commands to the CPU after the performance of the commands is completed.

In a case in which a subject to perform a target command, from among the commands, is the accelerator, the processing of the commands may include performing the target command in the accelerator. In a case in which the subject to perform the target command is the peripheral device, the processing of the commands may include transmitting the target command to the peripheral device.

In the case in which the subject to perform the target command is the peripheral device, after the target command is transmitted from the accelerator to the peripheral device, the target command may be performed in the peripheral device without intervention of the CPU.

In the case in which the subject to perform the target command is the peripheral device, after the target command transmitted from the accelerator is performed in the peripheral device, a completion message indicating completion of the performance of the target command may be transmitted from the peripheral device to the accelerator.

After performance of a first command, from among the commands, is completed, the processing of the commands may include processing a second command which is a subsequent command of the first command according to a corresponding subject of performance of the second command.

The accelerator may be included in a device together with the CPU, and configured to perform a neural network-based inference among processes that are capable of being processed in the device.

At least one command for the accelerator, from among the commands, may be a command for performing at least one neural network-based operation in the accelerator.

The commands received from the CPU may be stored in a command queue comprised in the accelerator based on one or both of a dependency and a performance order.

In a case in which a subject to perform a target command to be processed, from among the commands, is a peripheral device configured to communicate with another device, the processing of the commands may include transmitting, to the peripheral device, a processing result of the accelerator together with the target command. The target command may include connection information associated with a connection with the other device.

In a case in which a subject to perform a target command to be processed, from among the commands, is a storage device, the processing of the commands may include transmitting, to the storage device, the target command including information indicating whether to read data from the storage device or write data in the storage device.

The accelerator, the CPU, and the peripheral device may transmit or receive a data signal and/or a control signal through peripheral component interconnect express (PCIe) communication in the same device.

In another general aspect, an accelerator includes a core controller configured to transmit, to an accelerator controller or a peripheral device controller, a target command to be performed, from among commands received from a CPU and stored in a command queue according to a subject of performance of each command, the accelerator controller configured to receive, from the core controller, the target command in a case in which the accelerator is a subject to perform the target command and to perform the received target command, and the peripheral device controller configured to receive, from the core controller, the target command in a case in which a peripheral device is the subject to perform the target command and to transmit the received target command to the peripheral device. After performance of the commands stored in the command queue is completed, the core controller may transmit, to the CPU, a completion message indicating the completion of the performance of the commands.

In another general aspect, a device includes a CPU configured to transmit, to an accelerator, commands for the accelerator and a peripheral device, the accelerator configured to perform a target command, from among the commands, in a case in which the target command is to be performed by the accelerator, and transmit, to the peripheral device, the target command in a case in which the target command is to be performed by the peripheral device, and the peripheral device configured to perform the target command received from the accelerator in the case in which the target command is to be performed by the peripheral device. After performance of the commands is completed, the accelerator may transmit, to the CPU, a completion message indicating the completion of the performance of the commands.

In another general aspect, an accelerator includes one or more processors to: receive, from a central processing unit (CPU), one or more commands to be processed; determine, for each of the commands, whether the respective command is to be processed by the one or more processors or to be processed by a peripheral device; in a case in which it is determined that the respective command is to be processed by the one or more processors, process the respective command; in a case in which it is determined that the respective command is to be processed by the peripheral device, transmit the command to the peripheral device; and transmit a completion message to the CPU only after it is confirmed that all of the commands have been processed.

The one or more processors of the accelerator may determine, for each of the commands, whether the respective command is to be processed by the one or more processors or to be processed by the peripheral device based on whether the respective command requires performance of a neural network-based inference or calculation of a gradient for neural network learning.

The one or more processors of the accelerator may transmit, in the case in which it is determined that the respective command is to be processed by the peripheral device, a processing result of the one or more processors to the peripheral device, in a case in which it is determined that the processing result is needed for the peripheral device to perform the respective command.

The one or more processors of the accelerator may transmit the completion message to the CPU after receiving a command completion message from the peripheral device indicating that all of the commands to be processed by the peripheral device have been processed by the peripheral device.

Other features and aspects will be apparent from the following detailed description, the drawings, and the claims.

Figure 1A:
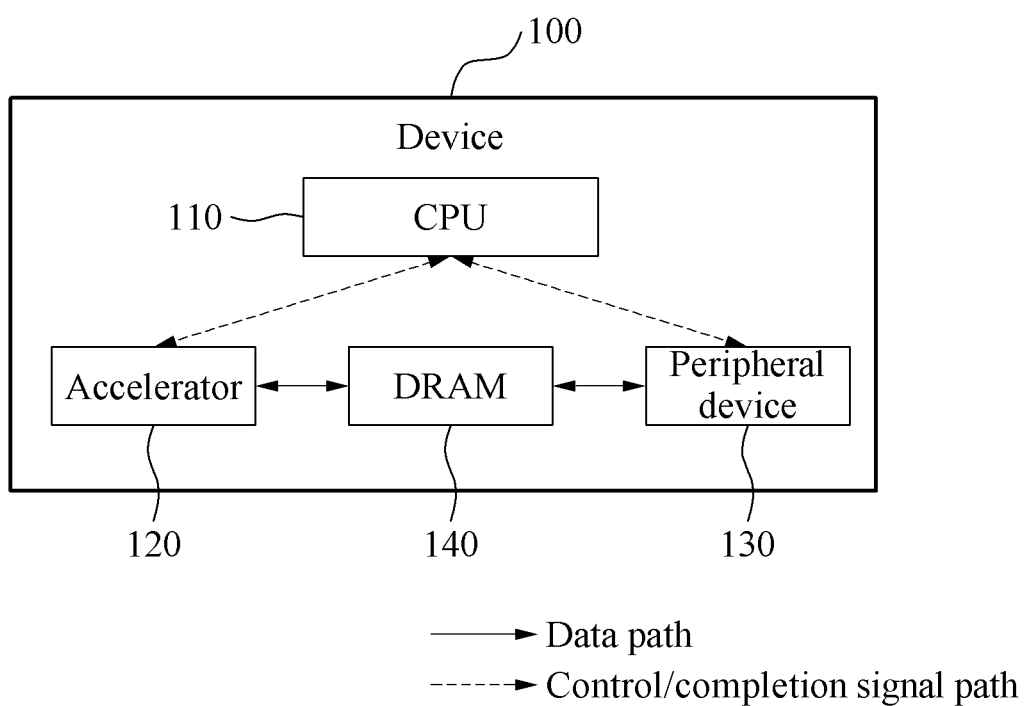
FIGS. 1a and 1b are diagrams illustrating an example of a device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

Figure 1B:
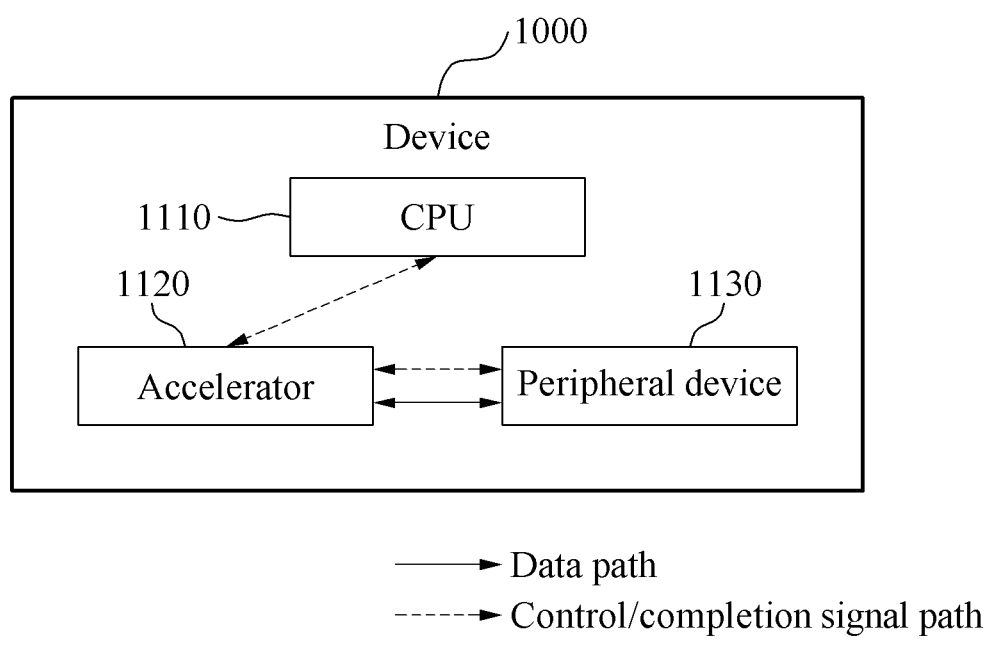

FIGS. 1a and 1b are diagrams illustrating an example of a device.

Referring to FIG. 1a, a device 100 includes a central processing unit (CPU) 110, an accelerator 120, a peripheral device 130, and a dynamic random-access memory (DRAM) 140.

In the example of FIG. 1a, when a destination of a result of a neural processing unit (NPU) operation to be performed in the accelerator 120 is the peripheral device 130, the CPU 110 may transmit a command for performing the NPU operation to the accelerator 120 through a control signal path. The accelerator 120 may perform the NPU operation upon the command, and store a result of performing the NPU operation in the DRAM 140 through a data path. The accelerator 120 may then transmit a completion message indicating completion of the performance of the command to the CPU 110 through a completion signal path. When the CPU 110 receives the completion message from the accelerator 120, the CPU 110 may transmit a command for reading the result of the NPU operation to the peripheral device 130 through a control signal path. The peripheral device 130 may then read the result of the NPU operation from the DRAM 140 upon the command of the CPU 110. For example, when the peripheral device 130 is a network interface device configured to communicate with another device, the peripheral device 130 may transmit the result of the NPU operation to the other device. For another example, when the peripheral device 130 is a storage, the peripheral device 130 may store the result of the NPU operation. The peripheral device 130 may then transmit a completion message to the CPU 110 through a completion signal path.

As described above with reference to FIG. 1a, the CPU 110 may transmit a command to a device, and then transmit a next command to another device in sequential order only after a completion message indicating completion of performance of the command is received. Thus, in such an example, frequent interventions of the CPU 110 may be required, resulting in an increase in latency. To minimize such unnecessary latency and improve throughput, there is provided a structure illustrated in FIG. 1b.

Referring to FIG. 1b, a device 1000 includes a CPU 1110, an accelerator 1120, and a peripheral device 1130.

The CPU 110 may be a universal processor configured to process a processing operation performed in the device 1000. The CPU 1110 may generate a command for another device included in the device 1000, for example, the accelerator 1120 and the peripheral device 1130, thereby controlling an operation of the other device. In an example, the CPU 1110 may transmit, to the accelerator 1120, commands for the accelerator 1120 and the peripheral device 1130. That is, the CPU 1110 may transmit, to the accelerator 1120, a command for the peripheral device 1130 in addition to a command for the accelerator 1120, rather than transmitting the command for the peripheral device 1130 directly to the peripheral device 1130. These commands may be transmitted from the CPU 1110 to the accelerator 1120 through a control signal path.

The accelerator 1120 may be a dedicated processor configured to process a processing operation that is more effectively performed in the dedicated processor rather than the universal processor, for example, the CPU 1110. For example, the accelerator 1120 may perform inference of input data by performing at least one operation based on a deep neural network (DNN). The accelerator 1120 may calculate a gradient to determine parameters of nodes included in a neural network. For example, the accelerator 1120 may include an NPU, a graphics processing unit (GPU), a tensor processing unit (TPU), and the like.

In an example, the accelerator 1120 may receive the commands for the accelerator 1120 and the peripheral device 1130 from the CPU 1110 through the control signal path. The accelerator 1120 may process the received commands according to a subject of performance of each of the commands. For example, when a subject to perform a target command among the received commands is the accelerator 1120, the accelerator 1120 may directly perform the target command. However, when a subject to perform a target command among the received commands is the peripheral device 1130, the accelerator 1120 may transmit the target command to the peripheral device 1130. The target command may be transmitted from the accelerator 1120 to the peripheral device 1130 through a control signal path between the accelerator 1120 and the peripheral device 1130. When an operation result processed and obtained from the accelerator 1120 is needed for the peripheral device 1130 to perform an operation involved with the target command, the operation result of the accelerator 1120 may be transmitted from the accelerator 1120 to the peripheral device 1130 through a data path.

The peripheral device 1130 may be a component included in the device 1000 along with the CPU 1110 and the accelerator 1120, and be embodied by various devices except the CPU 1110 and the accelerator 1120. For example, the peripheral device 1130 may include an interface device such as a network interface card (NIC), a storage device such as a solid-state drive (SSD), and the like. The peripheral device 1130 may perform an operation involved with the command received from the accelerator 1120. When the performance of the command is completed, a completion message indicating the completion of the performance of the command may be transmitted from the peripheral device 1130 to the accelerator 1120 through a completion signal path. When a processing result needs to be transmitted from the peripheral device 1130 to the accelerator 1120, the processing result may be transmitted from the peripheral device 1130 to the accelerator 1120 through the data path.

Although one peripheral device, for example, the peripheral device 1130, is illustrated in FIG. 1b for the convenience of description, a plurality of peripheral devices may be included in the device 1000 and the following description may be applied to the accelerator 1120 and each of the peripheral devices included in the device 1000.

When the commands transmitted from the CPU 1110 are all performed by the accelerator 1120 and/or the peripheral device 1130, the accelerator 1120 may transmit a completion message indicating completion of the performance of the commands to the CPU 1110. For the transmission of the completion message, a completion signal path may be used.

For example, when a destination of a result of an NPU operation is the peripheral device 1130, the following operations may be performed in the structure illustrated in FIG. 1b. The CPU 1110 may transmit all commands for the accelerator 1120 and the peripheral device 1130 to the accelerator 1120 through the control signal path. The NPU operation may be performed in the accelerator 1120 upon a first command among the commands. When a second command among the commands is for the peripheral device 1130, the accelerator 1120 may transmit the second command to the peripheral device 1130 through the control signal path. The peripheral device 1130 may then perform an operation involved with the second command. For example, the peripheral device 1130 may read a result of the NPU operation from the accelerator 1120 and transmit the result to another device. In this example, the result of the NPU operation may be transmitted from the accelerator 1120 to the peripheral device 1130 through the data path. The peripheral device 1130 may then transmit a completion message to the accelerator 1120 through the completion signal path. When the accelerator 1120 verifies that there are no more commands to be performed, the accelerator 1120 may transmit a completion message to the CPU 1110 through the completion signal path.

The control/completion signal path illustrated in FIG. 1b may include the control signal path or the completion signal path. Through the control signal path, a command may be transmitted. Through the completion signal path, a completion message may be transmitted. The data path may be a path through which data needed to perform a command or result data obtained by performing the command, for example, a result of an NPU operation, other than a command and a completion message, is transmitted.

Dissimilar to the structure described above with reference to FIG. 1a, the CPU 1110 may transmit all commands for both the accelerator 1120 and the peripheral device 1130 to the accelerator 1120, and the accelerator 1120 may then transmit a completion message to the CPU 1110 when all the commands are performed in the accelerator 1120 and/or the peripheral device 1130. Thus, intervention of the CPU 1110 may be minimized, and latency may thus be reduced effectively.

Figure 2:
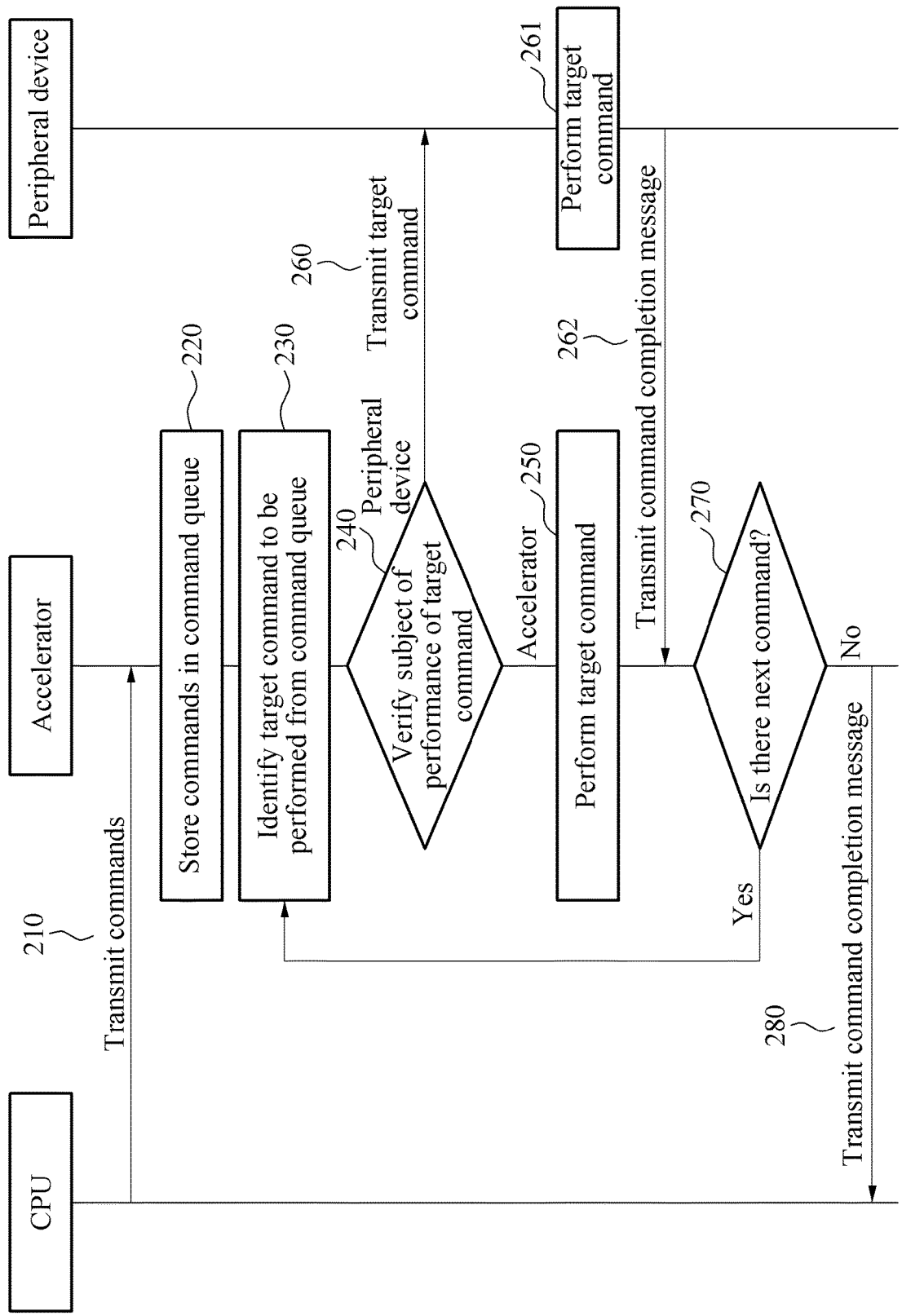
FIG. 2 is a diagram illustrating an example of an operation of each of a central processing unit (CPU), an accelerator, and a peripheral device.

FIG. 2 is a diagram illustrating an example of an operation of each of a CPU, an accelerator, and a peripheral device.

In the example of FIG. 2, how a CPU, an accelerator, and a peripheral device operate is illustrated in the form of a flowchart.

Referring to FIG. 2, in operation 210, the CPU transmits, to the accelerator, commands for the accelerator and the peripheral device. That is, in addition to at least one command for the accelerator, at least one command for the peripheral device may also be transmitted to the accelerator.

In operation 220, the accelerator stores the received commands in a command queue. The commands may be stored in the command queue based on dependency and/or a performance order. Thus, it is possible to prevent a next command from being performed before a current command is completely performed, and thus the commands may be performed based on the preset dependency and/or the performance order.

In operation 230, the accelerator identifies a target command to be performed from the command queue. To identify the target command to be performed, the dependency and/or the performance order of the commands stored in the command queue may be considered.

In operation 240, the accelerator verifies a subject of performance of the target command. For example, the accelerator may verify whether the target command is associated with the accelerator or the peripheral device. When the subject of the performance of the target command is the accelerator, operation 250 may be performed. When the subject of the performance of the target command is the peripheral device, operation 260 may be performed.

In operation 250, the accelerator performs the target command associated with the accelerator. For example, upon the target command, the accelerator may perform at least one operation, for example, a convolution operation, a rectified linear unit (ReLU) operation, and a sigmoid operation, that is defined in a neural network. That is, the accelerator may perform neural network-based inference or calculate a gradient for neural network learning, according to the target command.

In operation 260, the accelerator transmits the target command to the peripheral device. The target command may be associated with the peripheral device. According to an example, a processing result of the accelerator that is needed for the peripheral device to perform the target command may be additionally transmitted to the peripheral device.

In operation 261, the peripheral device performs the target command associated with the peripheral device. For example, when the peripheral device is an interface device configured to communicate with another device, the peripheral device may transmit the processing result of the accelerator to the other device. For another example, when the peripheral device is a storage device, the peripheral device may read data from the storage device or write the processing result of the accelerator in the storage device.

In operation 262, when the performance of the target command is completed in the peripheral device, the peripheral device transmits a command completion message to the accelerator, not to the CPU.

In operation 270, when the performance of the target command is completed in the accelerator or the peripheral device, the accelerator verifies whether there is a next command. For example, the accelerator may verify whether there is a command in the command queue that is yet to be performed. When there is the next command or the command yet to be executed, operation 230 may be performed and the next command may be performed according to a corresponding subject of performance of the next command. When there is not the next command or the command yet to be executed, operation 280 may be performed.

In operation 280, when performance of all the commands received from the CPU and stored in the command queue is completed, the accelerator transmits a command completion message to the CPU.

As described above, all commands associated with both the accelerator and the peripheral device may be transmitted from the CPU to the accelerator, and a command completion message may be transmitted from the accelerator to the CPU when performance of all the commands is completed, rather than the CPU intervening and giving a next command each time performance of each command is completed by the accelerator or the peripheral device. Thus, it is possible to minimize latency that may occur due to the intervention of the CPU and reduce a load on the CPU, thereby enabling faster processing. Through the structure that may minimize the intervention of the CPU, it is possible to remove the participation of hardware except for the accelerator and the peripheral device, and effectively reduce the latency. Thus, it is possible to improve throughput, and effectively reduce the size of a DRAM needed to store an operation result of the accelerator in an internal memory of the accelerator.

FIGS. 3 through 6 are diagrams illustrating examples of how an accelerator transmits a command directly to a peripheral device.

Figure 3:
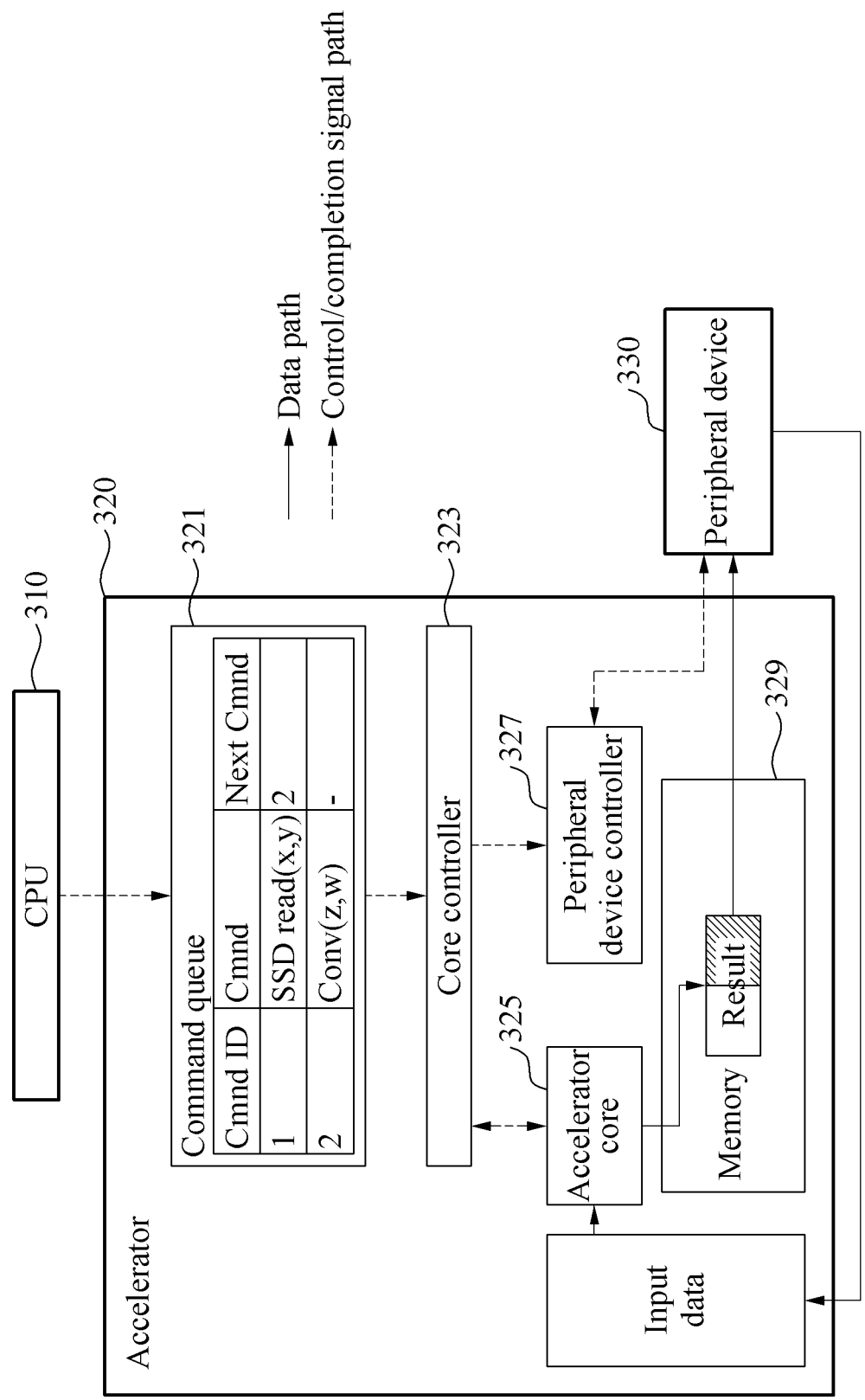
FIGS. 3, 4, 5, and 6 are diagrams illustrating examples of how an accelerator transmits a command directly to a peripheral device.

Referring to FIG. 3, a peripheral device 330 may receive a command from an accelerator 320 and perform the received command.

A CPU 310 may transmit, to the accelerator 320, commands associated with the accelerator 320 and the peripheral device 330. The commands received by the accelerator 320 may be stored in a command queue 321 based on dependency and/or a performance order. In the command queue 321, Cmnd ID indicates an identifier of a command, and Cmnd indicates a content of a command. Next Cmnd indicates whether a next command is present or not, or an identifier of the next command. In the example of FIG. 3, Cmnd indicates a command.

A core controller 323 may identify a target command that needs to be performed at a current time from the command queue 321, verify a subject of performance of the identified target command, and transmit the target command to an accelerator core 325 or a peripheral device controller 327. When the subject to perform the target command is the accelerator 320, the core controller 323 may transmit the target command to the accelerator core 325. When the subject to perform the target command is the peripheral device 330, the core controller 323 may transmit the target command to the peripheral device controller 327.

The accelerator core 325 may perform the target command received from the core controller 323. For example, the accelerator core 325 may perform an inference operation in response to input data by performing an operation based on a neural network. A result of the operation performed by the accelerator core 325 may be stored in an internal memory 329. In the internal memory 329, a hatched portion may indicate a portion in which data is stored, and an empty portion may indicate a portion in which data is not stored and is thus available for a new operation result to be stored therein.

The peripheral device controller 327 may transmit the target command to the peripheral device 330 such that the target command received from the core controller 323 is performed by the peripheral device 330. According to an example, when the operation result of the accelerator core 325 is needed for the peripheral device 330 to perform the target command, the operation result stored in the internal memory 329 may be transmitted to the peripheral device 330.

The peripheral device 330 may perform the target command received from the peripheral device controller 327. When the performance of the target command is completed, the peripheral device 330 may transmit a command completion message to the peripheral device controller 327 to notify that the performance of the target command is completed.

Hereinafter, examples will be described in greater detail.

Figure 4:
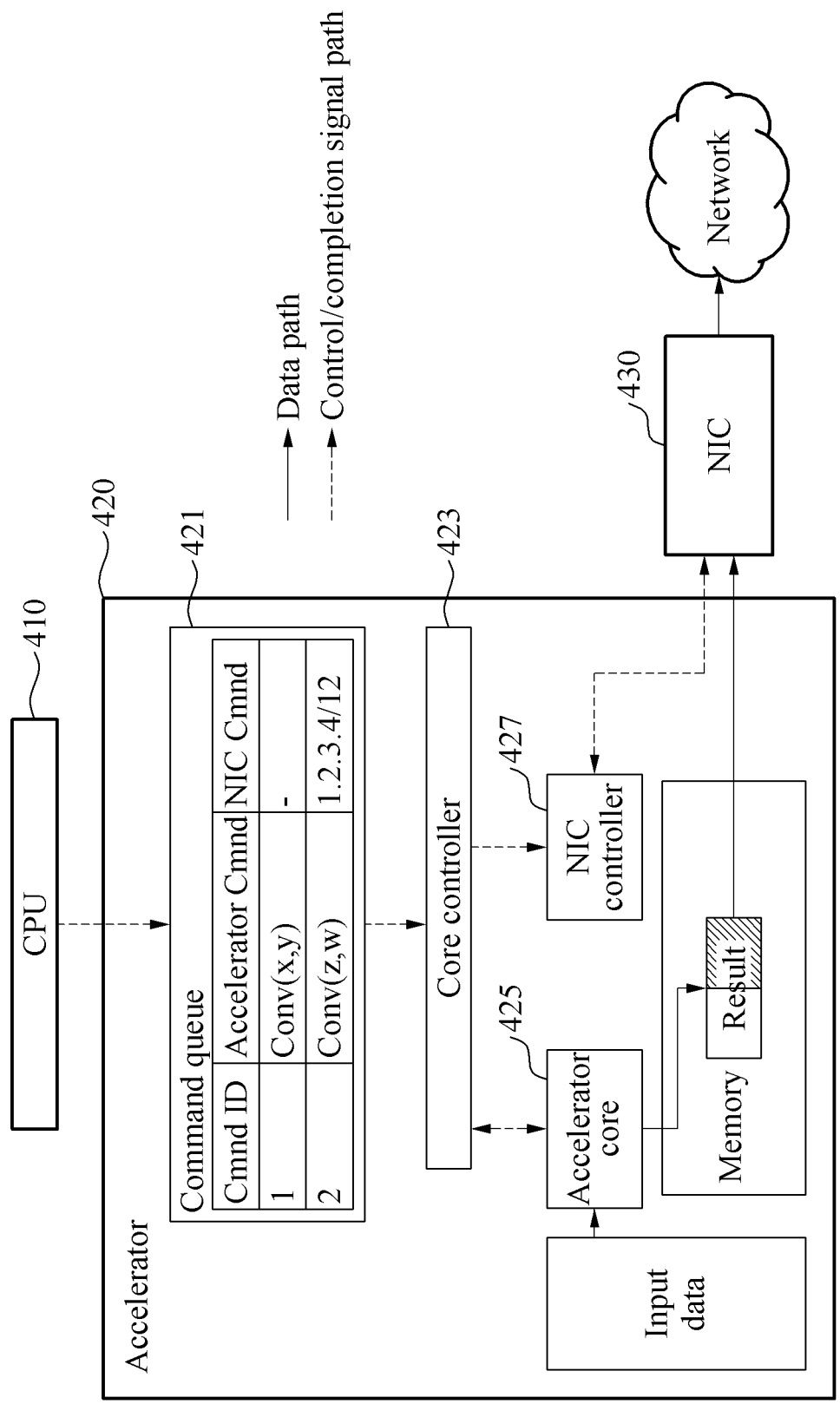

Referring to FIG. 4, an NIC 430 may receive a command from an accelerator 420 and perform the received command. The NIC 430 may be an example of an interface device configured to communicate with another device. However, examples are not limited to the NIC 430, and other various interface and/or communication devices may be applied.

A result of an operation performed by the accelerator 420, for example, a gradient, may be transmitted immediately to the NIC 430 without intervention or help of a CPU 410 and then transmitted to another device, for example, another server, through a network. Such a method may enable rapid data sharing, which will be described in detail hereinafter.

When there is a need to transmit such an operation result of the accelerator 420 to an outside of a device, the CPU 410 may transmit, to the accelerator 420, a command for the NIC 430 in addition to a command for the accelerator 420. For this, a bit indicating whether there is an associated NIC command may be separately present.

The commands received from the CPU 410 may be stored in a command queue 421. In the example of FIG. 4, in the command queue 421, an NIC command that needs to be performed after an accelerator command may be stored as a pair in a same row as where the accelerator command is. For example, for a first command, an NIC command may not need to be performed after an accelerator command, except that a second command may be performed. However, the second command may indicate that an NIC command needs to be performed after an accelerator command because the NIC command is after the accelerator command.

When a core controller 423 verifies that a command to be performed is associated with the accelerator 420 by referring to the command queue 421, the core controller 423 may transmit such an accelerator command to an accelerator core 425 based on availability of the accelerator core 425. For example, when the availability of the accelerator core 425 is low, the core controller 423 may transmit the accelerator command to the accelerator core 425 after a preset amount of time elapses or when the availability becomes greater than or equal to a threshold rate.

The accelerator core 425 may perform an operation according to the received accelerator command. For example, when Conv(z, w) is received as the accelerator command, the accelerator core 425 may perform a convolution operation on (z, w). When performance of the operation is completed, a result of performing the operation may be stored in an internal memory, and the accelerator core 425 may notify the core controller 423 of the completion of the performance of the command.

When the core controller 423 verifies that there is an associated NIC command by referring to the command queue 421, the core controller 423 may transmit the NIC command to an NIC controller 427. The NIC command may include connection information associated with a network connection between the device and another device, for example, a counterpart server, to which the operation result needs to be transmitted, information associated with data of the operation result to be transmitted, for example, a physical address in which the operation result is stored in the internal memory, a length of the data of the operation result, and the like. For example, when the device is connected to the other device according to an Internet Protocol version 4 (IPv4) transmission control protocol (TCP), the NIC command may include an IP address of each of the device and the other device, port information, and TCP ack/seq. number, and the like.

That is, by referring to the command queue 421, it is possible to verify whether the operation result needs to be transmitted to an outside of the device after the accelerator core 425 performs the corresponding command, and verify where to transmit the operation result.

As described above, the core controller 423 may read a command from the command queue 421, and distribute a corresponding command to the accelerator core 425 and the NIC controller 427.

The NIC controller 427 may be a logic installed in the accelerator 420 to control the NIC 430. In an example, the NIC controller 427 may include a transmission queue and a completion queue to control the NIC 430. To transmit a command to the NIC 430, the NIC controller 427 may input the command to the transmission queue and then write a value in a doorbell, for example, an internal register, of the NIC 430. The NIC 430 may then read the command from the transmission queue to perform an operation, for example, transmit an operation result to another device, and then write a corresponding result in the completion queue. The core controller 423 may then determine whether performance of the command is completed or not based on the completion queue. In the example of FIG. 4, an NIC command 1.2.3.4/ 12 stored in the command queue 421 may be information needed to generate a TCP header for TCP communication. A pair of the transmission queue and the completion queue may be present as a plurality of pairs for a single NIC 430. In such a case, various accelerators may use the NIC 430 simultaneously.

When all the commands stored in the command queue 421 are performed, the core controller 423 may transmit, to the CPU 410, a command completion message along with an interruption. When the performance of all the commands including the command for the NIC 430 is completed, the accelerator 420 may transmit the command completion message to the CPU 410. Thus, it is possible to prevent an increase in unnecessary latency by restricting participation of the CPU 410 until an operation result is obtained from the accelerator 420 and transmitted to another device.

In an example, the accelerator 420 and the NIC 430 may be present in different boards, and the CPU 410, the accelerator 420, and the NIC 430 may be connected through peripheral component interconnect express (PCIe) interconnection. Through communication between the CPU 410 and the accelerator 420, commands may be mainly exchanged. Through communication between the accelerator 420 and the NIC 430, commands and data, for example, an operation result, may be exchanged. In addition, components in the accelerator 420 may communicate with one another on a circuit.

Through the method described above, it is possible to more rapidly transmit data to an outside of the device, and enable rapid data sharing in a distributed processing environment. For example, in a neural network learning process where updating needs to be performed through sharing gradients between servers, a learning time may be reduced through the method. By allowing the NIC 430 to externally transmit an operation result immediately when the operation result is obtained, it is possible to reduce a size of a DRAM that stores the operation result.

Figure 5:
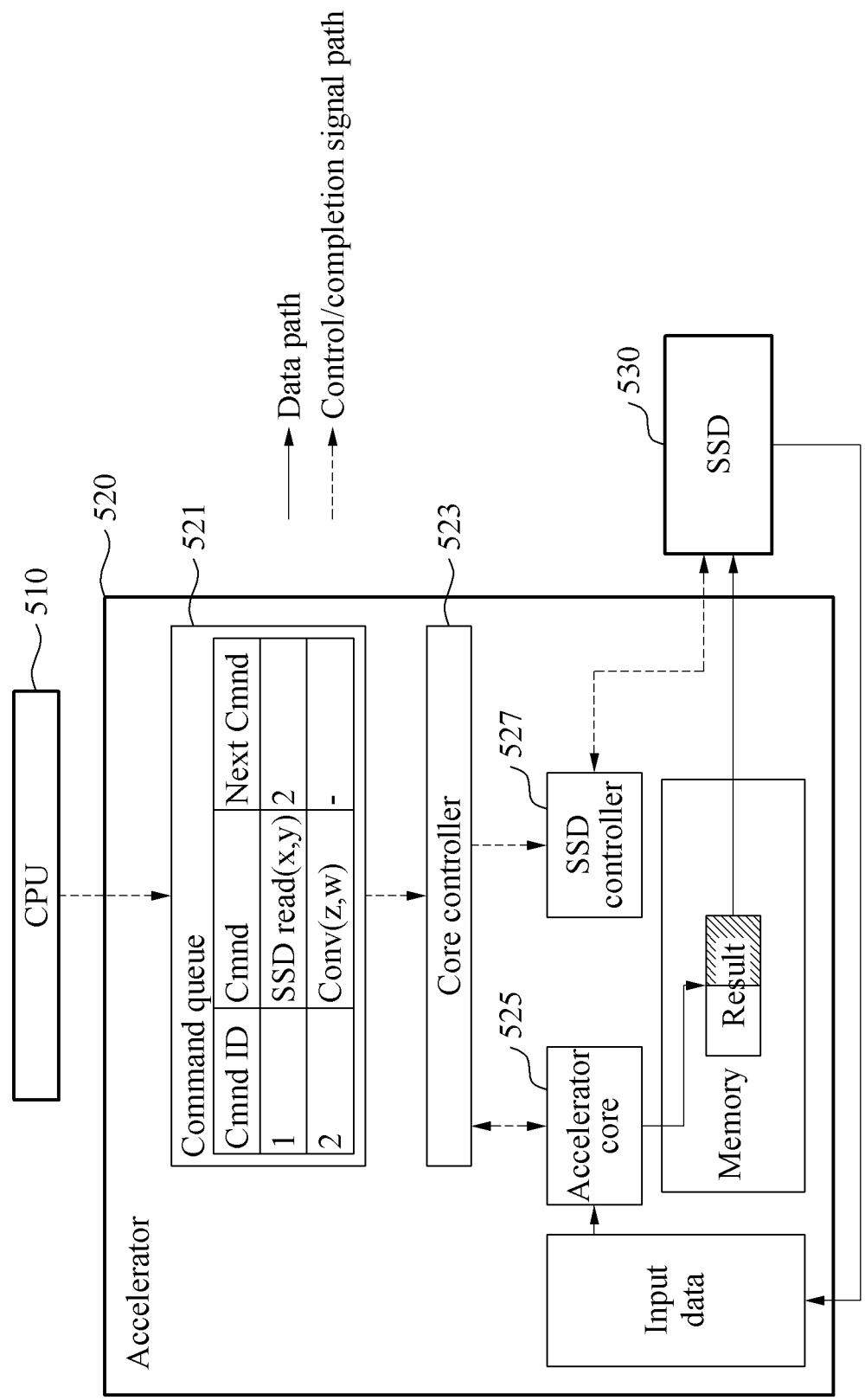

Referring to FIG. 5, an SSD 530 may receive a command from an accelerator 520 and perform the received command. The SSD 530 may be an example of a storage device included in a device. However, examples are not limited to the SSD 530, and other various storage devices may be applied.

The accelerator 520 may receive commands for the accelerator 520 and the SSD 530 from a CPU 510. A core controller 523 may transmit a command for the SSD 530 to the SSD 530 through an SSD controller 527 such that the command is performed. For this, the accelerator 520 may include the SSD controller 527 to control the SSD 530, and a corresponding form of command may be stored in a command queue 521. For example, an SSD command to be stored in the command queue 521 may include information associated with a position and a length of internal SSD data, and information indicating whether to read or write data.

For example, when an operation needs to be performed by reading data from the SSD 530, an SSD read command may be first performed. When the performance of the SSD read command is completed, an accelerator core 525 may immediately start the operation. Thus, it is possible to enable a rapid operation without latency due to the CPU 510.

In the command queue 521, SSD read(x, y) indicates an SSD command for reading data based on (x, y), and Conv(z, w) indicates an accelerator command for performing a convolution operation on (z, w). Next Cmnd indicates whether there is a next command, or an identifier of the next command. The commands may be represented in a form of chain.

Through the method described above, even when massive data is stored in a storage device, for example, the SSD 530, a rapid operation may be enabled by allowing the accelerator 520 to start an operation immediately after the data is read.

Figure 6:
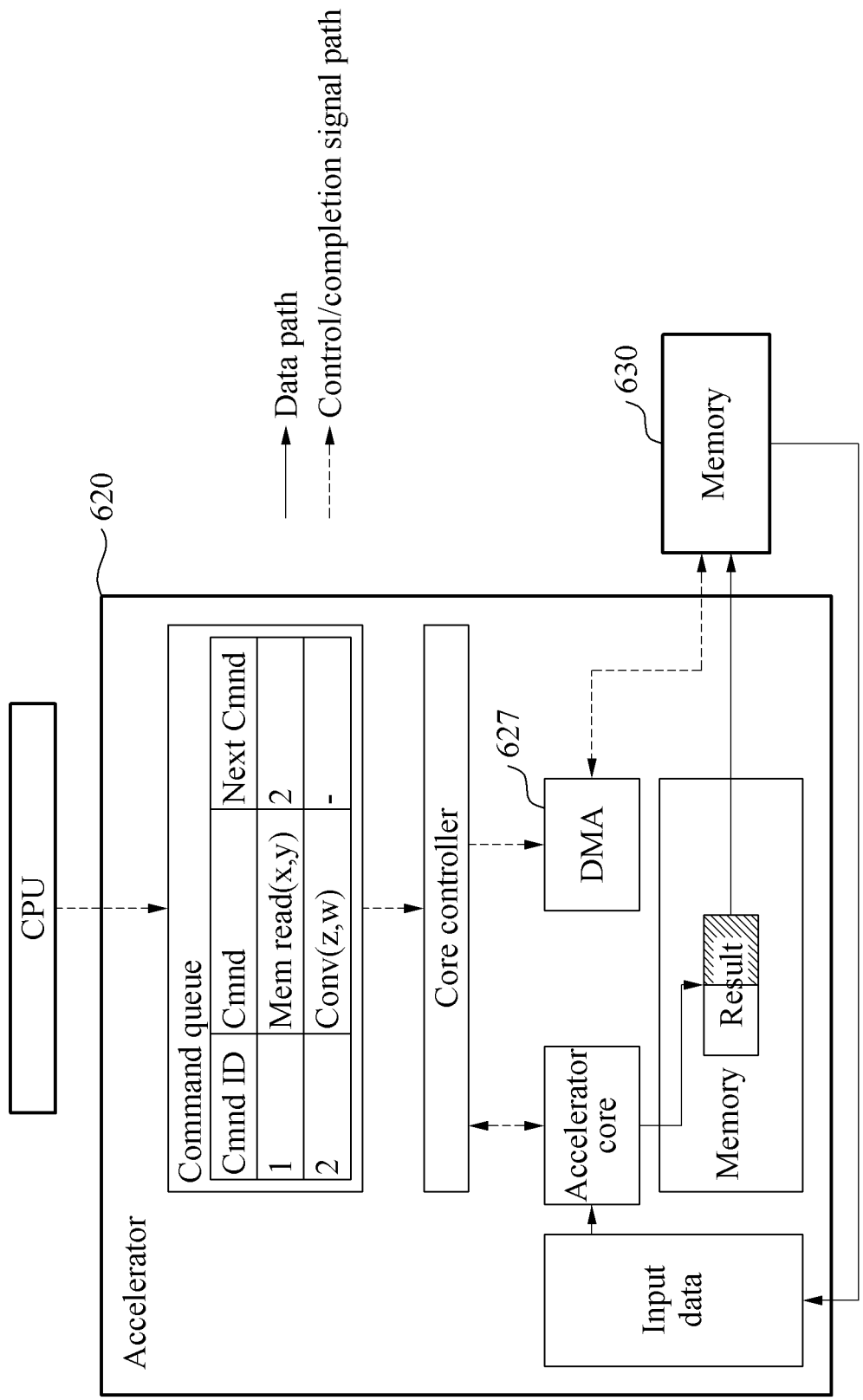

Referring to FIG. 6, a memory 630 may receive a command from an accelerator 620 and perform the received command. The memory 630 may be a memory that is accessible through PCIe communication and be, for example, an internal GPU memory and an internal CPU memory. In this example, the memory 630 may be accessible through a direct memory access (DMA) 627 included in the accelerator 620. Even when data is included in the internal GPU memory or the internal CPU memory due to a disk cache of an operating system (OS), for example, it is possible to minimize latency by applying the method described above.

Figure 7:
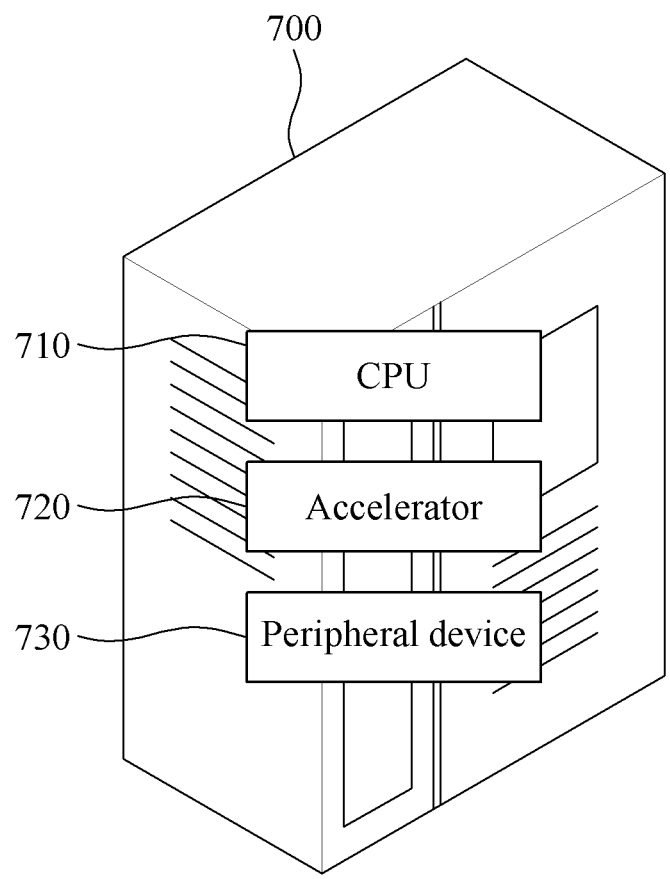
FIGS. 7 and 8 are diagrams illustrating examples of a device.
Figure 8:
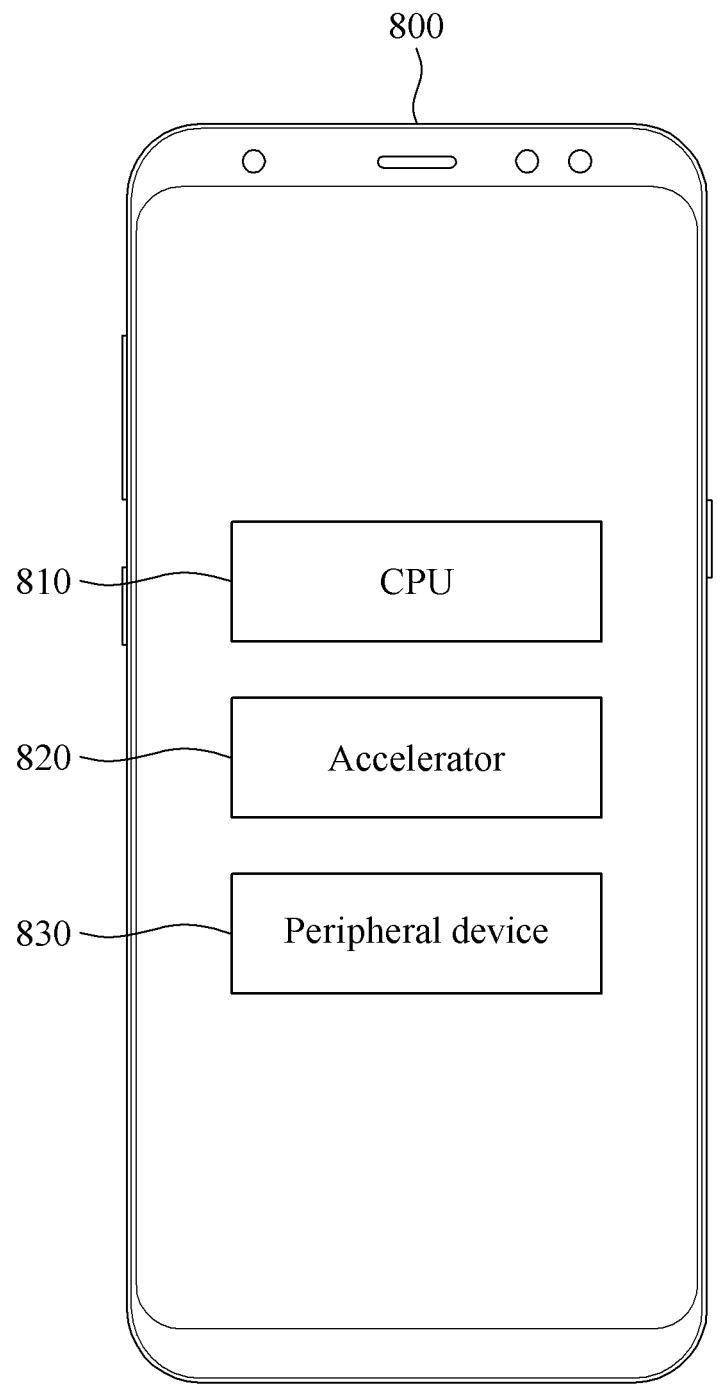

FIGS. 7 and 8 are diagrams illustrating examples of a device.

Referring to FIG. 7, a device may be a server 700. The server 700 includes a CPU 710, an accelerator 720, and a peripheral device 730. The CPU 710 may transmit, to the accelerator 720, commands for the accelerator 720 and the peripheral device 730. The accelerator 720 may process the received commands according to a subject of performance of each of the commands. The peripheral device 730 may perform a command transmitted from the accelerator 720 and transmit a completion message indicating completion of the performance of the command to the accelerator 720. When all the commands are performed, the accelerator 720 may transmit a completion message indicating completion of the performance of the commands to the CPU 710.

Referring to FIG. 8, a device may be a user terminal 800. The user terminal 800 includes a CPU 810, an accelerator 820, and a peripheral device 830. Each of such components may perform corresponding operations described above with reference to FIG. 7. Although a smartphone is illustrated as an example of the user terminal 800 in FIG. 8 for the convenience of description, various computing devices such as a personal computer (PC), a tablet PC, and a laptop, various wearable devices such as a smartwatch and smart eyeglasses, various home appliances such as a smart speaker, a smart television (TV), and a smart refrigerator, and a smart vehicle, a smart kiosk, an internet of things (IoT) device, and the like may be applied without restriction.

Figure 9:
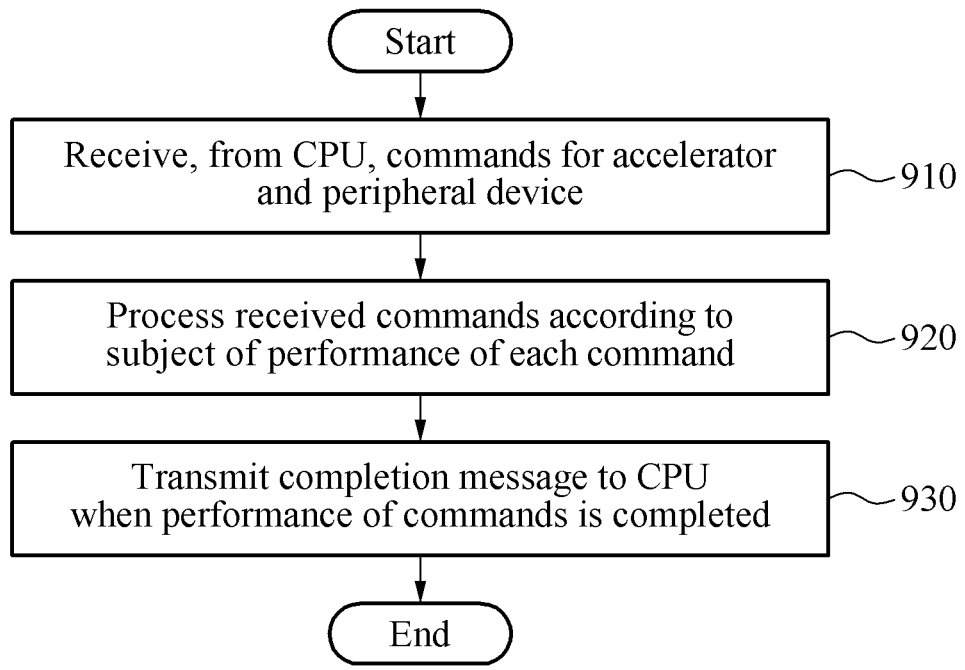
FIG. 9 is a flowchart illustrating an example of a method of operating an accelerator.

FIG. 9 is a flowchart illustrating an example of a method of operating an accelerator.

In the example of FIG. 9, how an accelerator operates is illustrated.

Referring to FIG. 9, in operation 910, the accelerator receives, from a CPU, commands for the accelerator and a peripheral device of the accelerator. In operation 920, the accelerator processes the received commands according to a subject of performance of each of the commands. In operation 930, when performance of the commands is completed, the accelerator transmits, to the CPU, a completion message indicating the completion of the performance of the commands.

For a more detailed description of the operations described above with reference to FIG. 9, reference may be made to what is described above with reference to FIGS. 1a through 8.

The accelerator, the device including the accelerator, and other apparatuses, units, modules, devices, and other components described herein with respect to FIGS. 1b, and 3-8 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1b-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An electronic device comprising:
   a processor;
   a peripheral device; and
   an accelerator configured to:
      identify a target command among plural commands received from the processor;
      selectively, based on the identification, perform one between performance of the target command by the accelerator and transmission of the target command to the peripheral device for the peripheral device to perform the target command; and
      indicate a result of the plural commands,
   wherein the accelerator is further configured to indicate the result of the plural commands based on a receipt by the accelerator of an indication, from the peripheral device, of a result of the target command when a result of the selective performance is the transmission of the target command to the peripheral device.

2. The device of claim 1,
wherein the accelerator is further configured to, when the result of the selective performance is the transmission of the target command to the peripheral device, transmit data to the peripheral device for the performance of the target command by the peripheral device, and
wherein the transmitted data is based on a result of another identified target command, of the plural commands, having been selected to be performed by the accelerator.

3. The device of claim 1, wherein, for the indication from the peripheral device of the result of the target command, the peripheral device is configured to transmit a completion message of the target command after performing the target command by peripheral device.

4. The device of claim 3,
wherein, for the indication of the result of the plural commands, the accelerator is configured to determine whether all respective target commands selected to be performed by the accelerator and selected to be transmitted to the peripheral device are completed based on whether there is an unprocessed command among the respective target commands selected to be performed by the accelerator, and whether the completion message is received by the accelerator from the peripheral device when the result of the selective performance is the transmission of the target command to the peripheral device, and
wherein the indication of the result of the plural commands includes, in response to a result of the determination being that the respective target commands are completed, a transmission of a completion message of the plural commands to the processor.

5. The device of claim 4, wherein, in response to the result of the determination being that the unprocessed command exists, the accelerator is further configured to process the unprocessed commands.

6. The device of claim 1, wherein the peripheral device is configured to, when a result of the selective performance is the performance of the target command by the accelerator, perform the transmitted target command without intervention of the processor.

7. The device of claim 1, wherein, for the performance of the target command by the accelerator, the accelerator is further configured to perform the target command by the accelerator through generation of a neural network-based inference.

8. The device of claim 1, wherein the accelerator is further configured to queue the plural commands of in a command queue of the accelerator based on one or both of respective dependencies and a performance orders of the plural commands.

9. The device of claim 1, wherein the accelerator, the processor, and the peripheral device are configured to respectively transmit or receive respective data signals and/or respective control signals through peripheral component interconnect express (PCIe) communication.

10. An accelerator, comprising:
an accelerator core configured to perform commands; and
a controller, configured to:
identify a target command among plural commands received from a processor exterior to the accelerator;
selectively, based on the identification, control a performing of one between performance of the target command by the accelerator and transmission of the target command to a peripheral device, exterior to the accelerator, for the peripheral device to perform the target command; and
indicate a result of the plural commands,
wherein the controller is further configured to indicate, to a device exterior of the accelerator, the result of the plural commands based on a receipt by the accelerator of an indication, from the peripheral device, of a result of the target command when a result of the selective performance is the transmission of the target command to the peripheral device.

11. The accelerator of claim 10, wherein the controller is further configured to, when the result of the selective performance is the transmission of the target command to the peripheral device, transmit data to the peripheral device for the performance of the target command by the peripheral device, and
wherein the transmitted data is based on a result or another identified target command, of the plural commands, having been selected to be performed by the accelerator.

12. The accelerator of claim 10, wherein for the indication from the peripheral device of the result of the target command, the controller is configured to receive a completion message of the target command indicating that the performance of the target command by the peripheral device is completed.

13. The accelerator of claim 12,
wherein, for the indication of the result of the plural commands, the controller is configured to determine whether all respective target commands selected to be performed by the accelerator and selected to be transmitted to the peripheral device are completed based on whether there is an unprocessed command among the respective target commands selected to be performed by the accelerator, and whether the completion message is received by the accelerator from the peripheral device when the result of the selective performance is the transmission of the target command to the peripheral device, and
wherein the indication of the result of the plural commands includes, in response to a result of the determination being that the respective target commands are completed, a transmission of a completion message of the plural commands to the processor.

14. The accelerator of claim 13, wherein, in response to the result of the determination being that the unprocessed command exists, the controller is configured to control the accelerator core to process the unprocessed command.

15. The accelerator of claim 10, wherein the controller is configured to, when a result of the selective performance is the transmission of the target command to the peripheral device, operate the peripheral device to perform the transmitted command without intervention of the exterior processor.

16. A method of operating an accelerator, comprising:
identifying a target command among plural commands received from a processor exterior to the accelerator;
selectively, based on the identification, controlling a performing of one between performance of the target command by the accelerator and transmission of the target command to a peripheral device, exterior to the accelerator, for the peripheral device to perform the target command; and indicating a result of the plural commands,
wherein the indicating of the result includes indicating, to a device exterior of the accelerator, the result of the plural commands based on a receipt by the accelerator of an indication, from the peripheral device, of a result of the target command when a result of the selective performing is the transmission of the target command to the peripheral device.

17. A non-transitory compute-readable storage medium storing commands that, when executed by a processor, cause the processor to perform the method of claim 16.

\* \* \* \* \*